Figure 1:
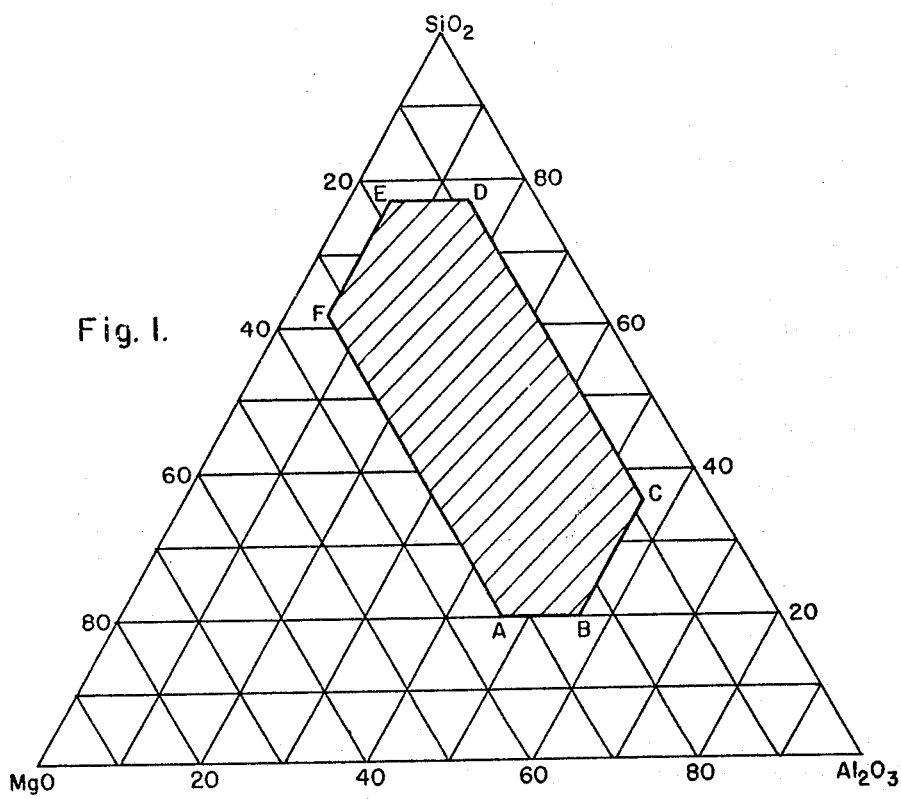

INVENTOR
Francis C. M. Lin

United States Patent Office 3,282,711
Patented Nov. 1, 1966

3,282,711
PRESHAPED TWO-PHASE GLASS CERAMIC BODY AND PROCESS FOR PREPARING THE SAME
Francis C. M. Lin, Plum Township, Allegheny County, Pa., assignor to Westinghouse Electric Corporation, Pittsburgh, Pa., a corporation of Pennsylvania
Filed May 3, 1961, Ser. No. 107,365
11 Claims. (Cl. 106—39)

This invention relates to a two-phase glass-ceramic preformed body and, more particularly, to a novel process for converting a glass body containing at least one select nucleating agent to a two-phase glass-ceramic body and to the product produced thereby.

This application is a continuation-in-part of U.S. patent application S.N. 802,532, now abandoned, filed March 27, 1959, the inventor and assignee of which are the same as in the present application.

Heretofore ceramic compositions consisting of an all glass phase have been prepared, and other ceramic compositions comprising substantially all crystalline phases, for example porcelain, have been available in the industry. It is known that each has certain desirable properties as well as certain shortcomings.

Glass is normally quite brittle and is sensitive to blows or shock. With some exceptions, glasses are sensitive to thermal shock so that, if heated to a high temperature and immersed in water, they will crack.

Porcelain products require careful manufacturing techniques and prolonged firing in order to develop their best properties. Other shortcomings, such as shrinkage during firing and distortion, are well known to those skilled in the art.

U.S. Patent 2,920,971 issued to Stanley D. Stookey is directed to a glass-ceramic product. However, this patent discloses only a glass-ceramic product prepared from a glassy composition containing $TiO_2$ as a nucleating agent to produce a crystalline phase, and states that less than 2% of $TiO_2$ is generally ineffective, so that the $TiO_2$ must be used in amounts of from 2% to 20% by weight. Furthermore, the Stookey process requires a high crystallization reaction temperature to produce a glass-ceramic body, which adds to the production difficulties and the cost of such products.

According to the present invention ceramic bodies are prepared as an initial glassy material which may be readily handled and shaped by glass forming techniques to predetermined desired shapes, and thereafter converted by heating at a relatively low temperature, as compared to porcelain and other known ceramic firing temperatures, into a two phase body comprising from 50% to approaching 100% and preferably from 85% to 95%, by weight, of extremely fine ceramic crystals dispersed in a glassy matrix. The matrix functions primarily to bind the crystals together. Such a body will hereinafter be defined as a two-phase glass-ceramic body. These glass-ceramic bodies have substantially the same size and shape as the original all glass body previous to the crystallization treatment.

An object of the present invention is to provide a two-phase glass-ceramic body comprised of from 50% to approaching 100%, by weight, of finely divided ceramic crystals, the remainder of the body being comprised of a glass matrix, which glass matrix functions primarily to bind the crystals together, and having no $TiO_2$ as a nucleating agent, and a process for preparing the same at a low crystallization temperature.

Another object of the present invention is to provide a two-phase glass ceramic body comprised of from 85% to 95% by weight of finely divided ceramic crystals and from 15% to 5%, by weight, of a glass matrix, which glass functions primarily to bind the crystals together, and having no $TiO_2$ as a nucleating agent, and a process for preparing the same at a low crystallization temperature.

Another object of the present invention is to provide a thermal process for converting a preformed glass body of predetermined composition containing at least one selected nucleating agent, excluding $TiO_2$, into a preformed two-phase glass-ceramic body having greatly improved properties, and of substantially the same size and shape as the original glass body.

Other objects of the invention will, in part, be obvious and will, in part, appear hereinafter.

Figure 2:
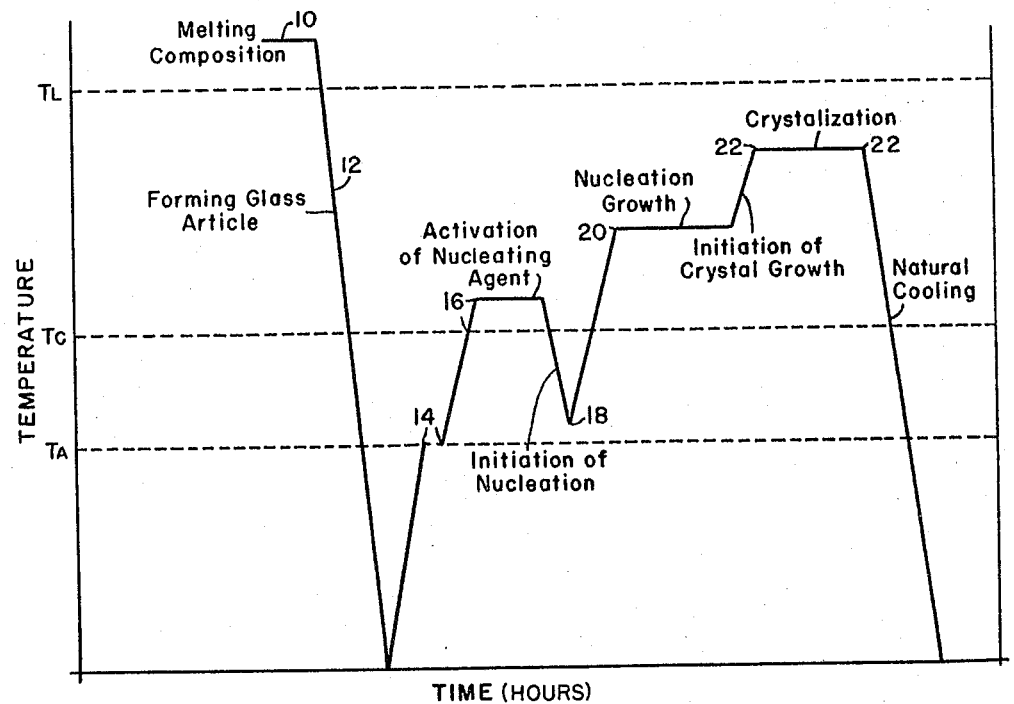
Figure 3:
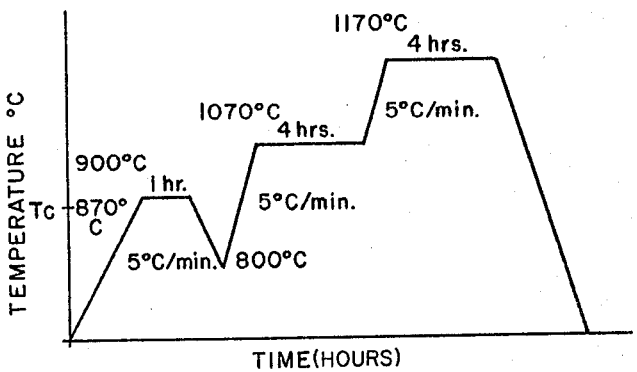
Figure 4:
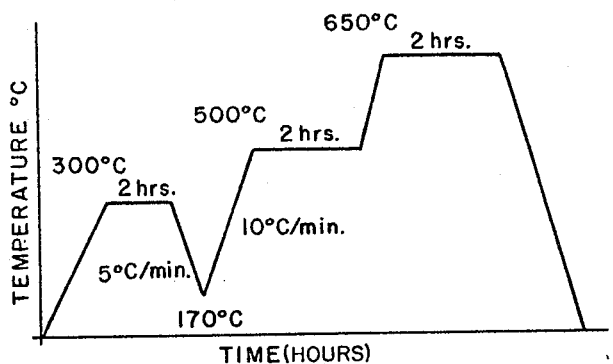

For a better understanding of the nature and objects of the invention, reference should be had to the following detailed description and drawings in which:

FIGURE 1 is a three-phase diagram of an aluminum-magnesium-silicate system;
FIGURE 2 is a graphical representation of the process of this invention plotting time against temperature; and
FIGS. 3 and 4 are graphical representations of the process of this invention applied to specific compositions.

In accordance with the present invention and attainment of the foregoing objects, there is provided a glass body of a predetermined composition which will be described more fully hereinafter and a process for converting the glass body into a two-phase glass-ceramic body. More particularly, the process for the preparation of a two-phase glass-ceramic body comprises (1) bringing a glass body of predetermined composition containing from 0.01% to 10%, and preferably from 0.1% to 2%, by weight, based on the weight of the body, of at least one nucleating agent selected from the group consisting of the elements copper, gold, silver and platinum; oxides of copper, cobalt, cadmium, zirconium, calcium, antimony, tin and manganese; carbonates of calcium, cobalt, lithium and cesium; sulfides of copper, cadmium and cobalt; chlorides of cadmium, cobalt, lithium, gold, silver, platinum and manganese, and fluorides of calcium, cadmium, sodium and lithium to a predetermined elevated first temperature 20° C. to 50° C. below the deformation temperature of the glass at which temperature the nucleating agent is activated, (2) maintaining said first temperature for a period of time sufficient to establish thermodynamic equilibrium throughout the body, (3) cooling the body to a second temperature within a range of from 50° C. to 100° C. lower than the first temperature, at a rate of from 2.5° C. to 8° C. per minute, whereby the nucleating agent will precipitate substantially uniformly throughout the body, (4) thereafter increasing the temperature of the body at a rate of from 2° C. to 10° C. per minute to a second temperature of from 50° C. to 100° C. above said first temperature, whereby nucleation growth is promoted, (5) maintaining said second temperature for a period of time within the range of 2 to 4 hours, (6) again increasing the temperature of the body to a temperature within 100° C. to 200° C. of the liquidus temperature of the body, whereby crystallization of the main portion of the glass body about the precipitated nucleating agent is initiated, (7) maintaining said temperature for a period of time within the range of 2 hours to 4 hours whereby there results a body having from 85% to 95%, by weight, of fine crystals having an average diameter of the order of approximately 10 to 15 microns, with some particles having diameters as small as 1 micron to as such as 25 microns, and the balance comprised of a glassy phase matrix surrounding and binding the crystals into the body. It has been found that for certain uses, especially where electrical properties and mechanical properties are not important, the crystallized portion of the body may comprise as low as 50%, by weight, of the body and may approach 100%, by weight of the body. When the body is comprised of approximately 50% by weight crystals, the body will usually have poor electrical properties and low mechanical strength in comparison to a body having a higher crystalline content. When, however, the crystalline portion exceeds 95%, by weight, and approaches 100%, by weight, of the body, the body has extremely little mechanical strength. Therefore, in the preferred embodiment of this invention the crystallized portion of the two phase glass-ceramic body will comprise 85% to 95%, by weight of the body.

It has been found that in practicing the teachings of this invention there is a large number of crystallizable compositions, the components of which can be initially melted to form a glass and which can then be transformed thereafter by the heat-treating process of this invention into a two-phase glass-ceramic body. Generally, the glass compositions amenable to this invention may be defined and classified as consisting essentially of at least one of the components $SiO_2$, $PbO$, $B_2O_3$, $GeO_2$ and $P_2O_5$, and one or more of the basic metal oxides $Al_2O_3$, $Li_2O$, $CaO$, $BeO$, $MgO$, $CoO$, $ZnO$, $ZrO_2$, $SrO$, $CdO$, $BaO$, $PbO$, $MnO$, $Fe_2O_3$ and $NiO$. Small amounts of alkali metal oxides such as sodium, lithium and potassium oxides may be present. In addition, lead silicate, lead borate and lead borate phosphate glasses which may contain small additions of other oxides have been found satisfactory. Particularly satisfactory glasses comprise the aluminum-magnesium-silicates and lead borosilicates.

With reference to FIG. 1, there is illustrated a three-phase $SiO_2$—$Al_2O_3$—$MgO$ diagram in which the shaded area A–B–C–D–E–F represents the preferred composition of $SiO_2$—$Al_2O_3$—$MgO$ glass melts to be used in the practice of this invention. It will be understood that no attempt has been made to show the presence of any other minor oxides and nucleating agents in FIG. 1. Other suitable glasses and their phase diagrams are set forth in "Phase Diagrams for Ceramists" by Levin, McMurdie and Hall.

Suitable nucleating agents which may be employed comprise at least one agent selected from the group consisting of the elements copper, gold, silver and platinum; oxides of copper, cobalt, calcium, cadmium, zirconium, antimony, tin and manganese; carbonates of calcium, cobalt, lithium and cesium; sulfides of copper, cadmium and cobalt; chlorides of cadmium, cobalt, lithium, gold, silver, platinum and manganese; and fluorides of calcium, cadmium, sodium and lithium. The total amounts of the nucleating agent is within the range of from 0.01% to 10%, and preferably from 0.1% to 2%, by weight, of the total weight of the melt. Normally, 0.01% to 0.1% by weight of nucleating agent will be sufficient to form the ceramic-glass composition of this invention. However, in some cases the nucleating agent may comprise up to 2% by weight of the composition. If it is not essential that the ceramic-glass body have good electrical insulating properties, the quantity of nucleating agent may be as high as 10% by weight. When the body comprises over 2% by weight of the nucleating agent the electrical conductivity of the body will usually be substantially increased, particularly at elevated temperatures.

A glass melt of the composition indicated above and comprised of from 0.01% to 10% and preferably from 0.1% to 2% by weight, based on the weight of the melt, of at least one suitable nucleating agent is prepared by placing raw ceramic materials into a crucible and heating them to a temperature which is in excess of the liquidus temperature ($T_L$) of the composition.

The melt is formed into a predetermined shape by any of the conventional glass forming processes, without the formation of any visible nuclei, such as pressing, blowing, casting or the like. The shaped member or body is cooled as rapidly as possible without cracking, for example, at a rate of about 190° C. to 200° C. per hour. If desired, the temperature of the resultant formed body is then raised to an annealing temperature ($T_A$) and the body annealed. However, this annealing is not necessary.

Referring to FIG. 2 of the drawing, there is depicted a curve indicating the entire temperature cycle to which a shaped glass body is subjected in accordance with the present invention. The portion 10 of the curve is the melting of the glass, the portion 12 is simply illustrative of the temperature drop as the body is shaped and point 14 is the annealing temperature which may be applied for a prolonged time. The temperature may drop from 14 to room temperature since the remainder of the heat treatment need not be applied until desired. In converting the glass body to the desired glass-ceramic composition, the temperature of the body is raised to a temperature 16 which is at least equal to the temperature ($T_c$), and preferably is slightly higher but less than the deformation temperature of the glass at which temperature 16 the nucleating agent is activated. $T_c$ is a temperature which may range from 20° C. to 50° C. below the deformation temperature of the glass. $T_c$ and the deformation temperature are obviously dependent on the glass composition.

The body is maintained at this activating temperature $T_c$ for a period of approximately one hour during which time the body achieves a condition of thermodynamic equilibrium throughout the body. This thermodynamic equilibrium assures the body having a constant viscosity throughout. While temperature 16 is shown as being constant, it may vary or fluctuate in the range of from $T_c$ to a level below the deformation temperature.

The temperature of the body is then lowered about 50° C. to 100° C. below the activation temperature to a temperature 18 at a cooling rate within the range of from 2.5° to 8° C. per minute. Due to this cooling, the nucleating agent precipitates substantially uniformly throughout the glass in extremely fine submicroscopic particles. Usually the glass appears to be somewhat cloudy or hazy at the end of this step.

The temperature of the body is then raised at a rate within the range of from 2° C. to 10° C. per minute to a temperature 20 which is in a range of from 50° C. to 100° C. above temperature $T_c$. During this heating step the particles of precipitated nucleating agent will grow to a size approaching an average diameter of .10 micron with some particles having a size as small as 0.01 micron and some may vary up to as much as about 1 micron. Care must be taken during this step not to heat the composition at too rapid a rate. If the temperature is allowed to rise at a rate in excess of 10° C. per minute, the precipitated particles of nucleating agent will redissolve. An increase of temperature at a rate of less than 2° C. per minute may prematurely crystallize the glass phase of the body.

The body is allowed to remain at this last temperature 20 for a period of from 2 to 4 hours to ensure completion of the nucleation growth. Thereafter the temperature of the body is raised at a rate of from 2° C. to 10° C. per minute to a temperature 22 which is from 100° C. to 200° C. below the liquidus temperature ($T_L$). This temperature is maintained for a period of time of from 2 to 4 hours during which time from 50% to almost 100% and preferably from 85% to 95% by weight of the glassy material is crystallized about the precipitated particles of nucleating agent into fine crystals having an average diameter of approximately 10 to 15 microns, though some crystals may have diameters as little as 1 micron, while a few others may be as large as 25 microns. The remaining portion, preferably from 15% to 5%, by weight, of the material remains in a glassy state forming a matrix surrounding the resulting crystals and binding them together.

The body is then allowed to cool to room temperature. It is opaque and somewhat resembles a porcelain body in appearance. Its shape and size is substantially that of the original formed glass member. It possesses outstanding properties as will be set forth in detail. Numerous attempts have been made to take photomicrographs of the structure of the final glass-ceramic body. In all cases the results have failed to reveal any definite structure. Photomicrographs at 100× magnification only show an apparently amorphous type structure. However, the use of an electron microscope at 30,000× did reveal the fine interlocking glass-crystal structure of the material as set forth herein. No etching agent, which is satisfactory with other materials, has resulted in the preferential etching of the product of the present invention.

The following examples in which all parts are by weight, are illustrative of the practice of this invention.

EXAMPLE I

A glassy composition comprising 62.6 parts $SiO_2$, 24.4 parts $Al_2O_3$, 13.0 parts MgO and 1 part LiF was melted and cast into two cube-shaped bodies and cooled to room temperature.

The process followed for one body in this Example I is illustrated graphically in FIG. 3.

The temperature of the body was raised to a temperature of 900° C. ($T_c$=870° C.) and maintained for approximately two hours.

The temperature of the body was then lowered at a rate of 5° C. per minute to a temperature of 800° C. During this period the nucleating agent LiF was observed to be precipitating substantially uniformly throughout the body.

The temperature was again raised at a rate of 5° C. per minute to a temperature of 1070° C. during which time the precipitated particles of nucleating agent grew in size so that the particles had an average diameter of the order of approximately 10 to 15 microns with some varying from 1 to 25 microns.

The temperature of the body was maintained at 1070° C. for a period of 4 hours to allow the body to achieve thermodynamic equilibrium and to ensure the completion of the nucleation growth.

The temperature of the body was then raised at a rate of 5° C. per minute to a temperature of 1170° C. during which time the glassy constituents began to crystallize about the precipitated particles of the nucleating agent.

The body was allowed to remain at this temperature for a period of 4 hours to allow the crystal growth to continue. At the end of this time, it was found that the body was comprised of about 85%, by weight, crystals and that the crystals were bonded together by the remaining, approximately 15%, by weight, of the material which was still in the glassy state.

The body was allowed to cool to room temperature at a rate of approximately 190° C. per hour.

The ability of the resulting glass-ceramic body to withstand thermal shock was determined by heating it repeatedly to a temperature of approximately 1000° C. and plunging it into ice water. The body did not crack.

The body had substantially the same dimensions as the original glass body.

The glass-ceramic body was exposed to hydrofluoric fumes for from 5 to 10 minutes without any appreciable etching taking place. The body was then submerged in concentrated hydrofluoric acid for two days without any appreciable etching.

The linear thermal expansion of the ceramic-glass body was measured over a temperature range of from 25° C. to 500° C. and found to be $8.0 \times 10^{-6}$ inches per inch per °C. The glass body which was not converted to a glass-ceramic body had a linear thermal expansion of $4.9 \times 10^{-6}$ inches per inch per °C. over the same temperature range.

The glass-ceramic body was found to have a deformation temperature of 900° C. while the unconverted body had a deformation temperature of 775° C.

The logarithm of the volume resistivity was determined for the glass-ceramic and unconverted glass body at various temperatures and is set forth in tabular form below.

Table

[Log. volume resistivity, ohm-cm.]

| Temp. | Glass-Ceramic Body | Glass body |
|---|---|---|
| 350 | 11.0 | 10.7 |
| 500 | 9.7 | 8.6 |
| 700 | 8.6 | 7.6 |
| 900 | 7.1 | 6.3 |

The ceramic-glass body of this example had two major crystalline phases, cordierite and sapphirine and two minor crystalline phases, mullite and tridymite.

The process of Example I can be followed for a borosilicate glass with equally good results.

EXAMPLE II

A glass composition comprised of 85%, PbO, 8%, $SiO_2$ and 7%, $Na_2CO_3$ to which was added 0.01% by weight $Li_2CO_3$ was melted and cast into a cube-shaped body and cooled to room temperature.

The process followed in Example II is set forth graphically in FIG. 4.

The temperature of the body was raised to 300° C. and maintained at this temperature for 2 hours to activate the nucleating agent.

The nucleating agent was then precipitated by lowering the temperature of the body at a rate of 5° C. per minute to a temperature of 170° C.

The temperature of the body was then raised at a rate of 10° C. per minute to a temperature of 550° C. and maintained there for 2 hours to ensure complete growth of the precipitated nucleating agent.

The temperature of the body was then raised at a rate of 10° C. per minute to a temperature of 650° C. and maintained at that temperature for 2 hours to allow the glassy state material to crystallize about the particles of nucleating agent. The body was then cooled to room temperature.

The body was found to be comprised of 80%, by weight, of crystals having an average size of 25 microns. The crystals were bonded together by the remaining 20% of the material which was still in the glassy state.

The general procedure of Examples I and II may be repeated employing any of the glass compositions and nucleating agents set forth hereinabove with equally satisfactory results. It will be appreciated of course, that the $T_L$, $T_c$ and $T_a$ will vary for each composition. For example, satisfactory glass-ceramic bodies have been prepared from glass compositions, all parts by weight, comprised of:

I

| Compound: | Parts |
|---|---|
| $SiO_2$ | 58.9 |
| $Al_2O_3$ | 12.0 |
| $MgO$ | 23.0 |
| $LiF$ | 0.1 |
| $Sb_2O_3$ | 1.0 |
| $SnO_2$ | 5.0 |

$T_L = 1538°$ C.
$T_a = 677°$ C.
$T_c = 538°$ C.

II

| Compound: | Parts |
|---|---|
| $SiO_2$ | 59.0 |
| $Al_2O_3$ | 12.4 |
| $MgO$ | 23.0 |
| $Sb_2O_3$ | 0.9 |
| $SnO_2$ | 4.7 |

$T_L = 1524°$ C.
$T_a = 663°$ C.
$T_c = 538°$ C.

III

| Compound: | Parts |
|---|---|
| $SiO_2$ | 56.6 |
| $Al_2O_3$ | 11.8 |
| $MgO$ | 21.8 |
| $Sb_2O_3$ | 0.8 |
| $SnO_2$ | 9.0 |

$T_L = 1510°$ C.
$T_a = 649°$ C.
$T_c = 538°$ C.

IV

| Compound: | Parts |
|---|---|
| $SiO_2$ | 62 |
| $Al_2O_3$ | 12 |
| $MgO$ | 25 |
| $ZrO_2$ | 1 |

$T_L = 1649°$ C.
$T_a = 732°$ C.
$T_c = 621°$ C.

V

| Compound: | Parts |
|---|---|
| $SiO_2$ | 63 |
| $Al_2O_3$ | 12.32 |
| $MgO$ | 24.66 |
| $PtCl_3$ | 0.02 |

$T_L = 1649°$ C.
$T_a = 732°$ C.
$T_c = 621°$ C.

VI

| Compound: | Parts |
|---|---|
| $SiO_2$ | 62 |
| $Al_2O_3$ | 13 |
| $MgO$ | 24 |
| $CuS$ | 1 |

$T_L = 1635°$ C.
$T_a = 704°$ C.
$T_c = 593°$ C.

Materials produced in accordance with the teachings of this invention have a variety of uses. In the electrical industry alone, the process may be used to produce insulators for power transmission lines, resistor spools, motor housings and lead-in bushings for transformers and capacitors, and housing and bases for tubes, semiconductors and other devices. In addition, the process can be used in the fabrication of chemical process equipment, household wares and in the fabrication of missiles and manned aircraft components. Electrical heating means such as resistance wire may be applied about such glass-ceramic bodies or may be inserted inside such bodies.

While the invention has been described with reference to particular embodiments and examples, it will be understood, of course, that modifications, substitutions, and the like may be made therein without departing from its scope.

I claim as my invention:

1. A process for the preparation of a two-phase glass-ceramic body consisting essentially of (1) preparing a crystallizable glass body from a charge containing at least one component selected from the group consisting of $SiO_2$, $PbO$, $B_2O_3$, $GeO_2$ and $P_2O_5$, and at least one oxide selected from the group consisting of $Al_2O_3$, $CaO$, $BeO$, $MgO$, $CoO$, $ZnO$, $ZrO_2$, $SrO$, $CdO$, $BaO$, $PbO$, $MnO$, $Fe_2O_3$ and $NiO$, and containing as the sole nucleating agent from 0.01% to 10% by weight, of at least one nucleating agent selected from the group consisting of the elements copper, gold, and silver; oxides of copper, cobalt, cadmium, calcium, antimony, and manganese; carbonates of calcium, cobalt, and cesium; sulfides of copper, cadmium, and cobalt; chlorides of cadmium, cobalt, gold, silver, and manganese; and fluoride of cadmium, bringing the glass body to a predetermined elevated first temperature at which the nucleating agent is activated, said elevated first temperature ranging from slightly less than the deformation temperature of the glass composition to 50° C. below the deformation temperature, (2) maintaining said first temperature for a period of time sufficient to establish thermodynamic equilibrium, (3) cooling the body from 50° C. to 100° C. at a rate of from 2.5° C. to 8° C. per minute, whereby the nucleating agent will precipitate substantially uniformly throughout the body, (4) increasing the temperature of the body at a rate of from 2° C. to 10° C. per minute to a second temperature from 50° C. to 100° C. above said first temperature, (5) maintaining the second temperature for a period of time of from 2 to 4 hours, (6) increasing the temperature of the body to a temperature within 100° C. to 200° C. of the liquidus temperature of the body, whereby crystallization of the glass about the precipitated nucleating agent is initiated, (7) maintaining said last temperature for a period of time of from 2 hours to 4 hours, whereby from at least 50% to almost 100% by weight of the body is crystallized about the precipitated nuclei, and (8) cooling the resulting body to room temperature.

2. A process for the preparation of a two-phase glass-ceramic body consisting essentially of (1) preparing a crystallizable glass body from a charge containing at least one component selected from the group consisting of $SiO_2$, $PbO$, $B_2O_3$, $GeO_2$ and $P_2O_5$, and at least one oxide selected from the group consisting of $Al_2O_3$, $CaO$, $BeO$, $MgO$, $CoO$, $ZnO$, $ZrO_2$, $SrO$, $CdO$, $BaO$, $PbO$, $MnO$, $FeO_3$ and $NiO$, and containing as the sole nucleating agent from 0.01% to 10% by weight, of at least one nucleating agent selected from the group consisting of the elements copper, gold, and silver; oxides of copper, cobalt, cadmium, calcium, antimony, and manganese; carbonates of calcium, cobalt, and cesium; sulfides of copper, cadmium, and cobalt; chlorides of cadmium, cobalt, gold, silver, and manganese; and fluoride of cadmium, bringing the glass body to a predetermined elevated first temperature at which the nucleating agent is activated, said elevated first temperature ranging from slightly less than the deformation temperature of the glass composition to 50° C. below the deformation temperature, (2) maintaining said first temperature for a period of time sufficient to establish thermodynamic equilibrium, (3) cooling the body from 50° C. to 100° C. at a rate of from 2.5° C. to 8° C. per minute, whereby the nucleating agent will precipitate substantially uniformly throughout the body, (4) increasing the temperature of the body at a rate of from 2° C. to 10° C. per minute to a second temperature from 50° C. to 100° C. above said first temperature, (5) maintaining the second temperature for a period of time of from 2 to 4 hours, (6) increasing the temperature of the body to a temperature within 100° C. to 200° C. of the liquids temperature of the body, whereby crystallization of the glass about the precipitated nucleating agent is initiated, (7) maintaining said last temperature for a period of time of from 2 hours to 4 hours, whereby from about 85% to 95% by weight, of the body is crystallized about the precipitated nuclei, and (8) cooling the resulting body to room temperature.

3. A process for the preparation of a two-phase glass-ceramic body consisting essentially of (1) preparing a crystallizable glass body from a charge containing as the sole nucleating agent from 0.01% to 2% by weight, of at least one nucleating agent selected from the group consisting of the elements, copper, gold, and silver; oxides of copper, cobalt, cadmium, calcium, antimony, and manganese; carbonates of calcium, cobalt, and cesium; sulfides of copper, cadmium and cobalt; chlorides of cadmium, cobalt, gold, silver, and manganese; and fluoride of cadmium bringing the glass body to a predetermined elevated first temperature at which the nucleating agent is activated, said elevated first temperature ranging from slightly less than the deformation temperature of the glass composition to 50° C. below the deformation temperature, (2) maintaining said first temperature for a period of time sufficient to establish thermodynamic equilibrium, (3) cooling the body from 50° C. to 100° C. at a rate of from 2.5° C. to 8° C. per minute, whereby the nucleating agent will precipitate substantially uniformly throughout the body, (4) increasing the temperature of the body at a rate of from 2° C. to 10° C. per minute to a second temperature from 50° C. to 100° C. above said first temperature, (5) maintaining the second temperature for a period of time of from 2 to 4 hours, (6) increasing the temperature of the body to a temperature within 100° C. to 200° C. of the liquidus temperature of the body, whereby crystallization of the glass about the precipitated nucleating agent is initiated, (7) maintaining said last temperature for a period of time of from 2 hours to 4 hours, whereby from about at least 50% to almost 100% by weight of the body is crystallized about the precipitated nuclei, and (8) cooling the resulting body to room temperature.

4. A process for the preparation of a two-phase glass-ceramic body consisting essentially of (1) preparing a crystallizable glass body from a charge containing at least one component selected from the group consisting of $SiO_2$, PbO, $B_2O_3$, $GeO_2$ and $P_2O_5$, and at least one oxide selected from the group consisting of $Al_2O_3$, CaO, BeO, MgO, CoO, ZnO, $ZrO_2$, SrO, CdO, BaO, PbO, MnO, $Fe_2O_3$ and NiO and containing as the sole nucleating agent from 0.01% to 2% by weight, of at least one nucleating agent selected from the group consisting of the elements, copper, gold, and silver; oxides of copper, cobalt, cadmium, calcium, antimony, and manganese; carbonates of calcium, cobalt, and cesium; sulfides of copper, cadmium and cobalt; chlorides of cadmium, cobalt, gold, silver, and manganese; and fluoride of cadmium bringing the glass body to a predetermined elevated first temperature at which the nucleating agent is activated, said elevated first temperature ranging from slightly less than the deformation temperature of the glass composition to 50° C. below the deformation temperature, (2) maintaining said first temperature for a period of time sufficient to establish thermodynamic equilibrium, (3) cooling the body from 50° C. to 100° C. at a rate of from 2.5° C. to 8° C. per minute, whereby the nucleating agent will precipitate substantially uniformly throughout the body, (4) increasing the temperature of the body at a rate of from 2° C. to 10° C. per minute to a second temperature from 50° C. to 100° C. above said first temperature, (5) maintaining the second temperature for a period of time of from 2 to 4 hours, (6) increasing the temperature of the body to a temperature within 100° C. to 200° C. of the liquidus temperature of the body, whereby crystallization of the glass about the precipitated nucleating agent is initiated, (7) maintaining said last temperature for a period of time of from 2 hours to 4 hours, whereby from about 85% to 95% by weight, of the body is crystallized about the precipitated nuclei, and (8) cooling the resulting body to room temperature.

5. A process for the preparation of a two-phase glass-ceramic body consisting essentially of (1) preparing a crystallizable glass body from containing at least one component selected from the group consisting of $SiO_2$, PbO, $B_2O_3$, $GeO_2$, and $P_2O_5$, and at least one oxide selected from the group consisting of $Al_2O_3$, CaO, BeO, MgO, CoO, ZnO, $ZrO_2$, SrO, CdO, BaO, PbO, MnO, $Fe_2O_3$ and NiO, and containing as the sole nucleating agent from 0.01% to 2% by weight, of at least one nucleating agent selected from the group consisting of the elements, copper, gold, and silver; oxides of copper, cobalt, cadmium, calcium, antimony, and manganese; carbonates of calcium, cobalt, and cesium; sulfides of copper, cadmium and cobalt; chlorides of cadmium, cobalt, gold, silver, and manganese; and fluoride of cadmium bringing the glass body to a predetermined elevated first temperature at which the nucleating agent is activated, said elevated first temperature ranging from slightly less than the deformation temperature of the glass composition to 50° C. below the deformation temperature, (2) maintaining said first temperature for a period of time sufficient to establish thermodynamic equilibrium, (3) cooling the body from 50° C. to 100° C. at a rate of from 2.5° C. to 8° C. per minute, whereby the nucleating agent will precipitate substantially uniformly throughout the body, (4) increasing the temperature of the body at a rate of from 2° C. to 10° C. per minute to a second temperature from 50° C. to 100° C. above said first temperature, (5) maintaining the second temperature for a period of time of from 2 to 4 hours, (6) increasing the temperature of the body to a temperature within 100° C. to 200° C. of the liquidus temperature of the body, whereby crystallization of the glass about the precipitated nucleating agent is initiated, (7) maintaining said last temperature for a period of time of from 2 hours to 4 hours, whereby from about 85% to 95% by weight, of the body is crystallized about the precipitated nuclei, and (8) cooling the resulting body to room temperature.

6. A process for the preparation of a two-phase glass-ceramic body consisting essentially of (1) preparing a crystallizable glass body from a charge containig at least one component selected from the group consisting of $SiO_2$, PbO, $B_2O_3$, $GeO_2$ and $P_2O_5$ and at least one basic metal oxide selected from the group consisting of $Al_2O_3$, $Li_2O$, CaO, BeO, MgO, CoO, ZnO, $ZrO_2$, SrO, CdO, BaO, PbO, MnO, $Fe_2O_3$ and NiO and containing as the sole nucleating agent from 0.01% to 10% by weight, of at least one nucleating agent selected from the group consisting of the elements copper, gold, and silver; oxides of copper, cobalt, cadmium, calcium, antimony, and manganese; carbonates of calcium, cobalt, and cesium; sulfides of copper, cadmium and cobalt; chlorides of cadmium, cobalt, gold, silver, and manganese; and fluoride of cadmium, bringing the glass body to a predetermined elevated first temperature at which the nucleating agent is activated, said elevated first temperature being 20° C. to 50° C. below the deformation temperature of the glass, (2) maintaining said first temperature for a period of time sufficient to establish thermodynamic equilibrium, (3) cooling the body from 50° C. to 100° C. at a rate of from 2.5° C. to 8° C. per minute, whereby the nucleating agent will precipitate substantially uniformly throughout the body, (4) increasing the temperature of the body at a rate of from 2° C. to 10° C. per minute to a second temperature from 50° C. to 100° C. above said first temperature, (5) maintaining the second temperature for a period of time of from 2 to 4 hours, (6) increasing the temperature of the body to a temperature within 100° C. to 200° C. of the liquidus temperature of the body, whereby crystallization of the glass about the precipitated nucleating agent is initiated, (7) maintaining said last temperature for a period of time of from 2 hours to 4 hours, whereby from about 85% to 95% by weight, of the body is crystallized about the precipitated nuclei, and (8) cooling the resulting body to room temperature.

7. A process for the preparation of a two-phase glass-ceramic body consisting essentially of (1) preparing a glass body from a charge comprising, by weight, 20% to 78% SiO$_2$, 9% to 33% MgO and 4% to 55% Al$_2$O$_3$ and from 10% to 0.01%, by weight, as the sole nucleating agent at least one nucleating agent selected from the group consisting of the elements copper, gold, and silver; oxides of copper, cobalt, cadmium, calcium, antimony, and manganese; carbonates of calcium, cobalt, lithium and cesium; sulfides of copper, cadmium and cobalt; chlorides of cadmium, cobalt, lithium, gold, silver and manganese; and fluorides of cadmium and lithium, bringing the glass body to a predetermined elevated first temperature at which the nucleating agent is activated, said elevated first temperature ranging from slightly less than the deformation temperature of the glass composition to 50° C. below the deformation temperature, (2) maintaining said first temperature for a period of time sufficient to establish thermodynamic equilibrium, (3) cooling the body from 50° C. to 100° C. at a rate of from 2.5° C. to 8° C. per minute, whereby the nucleating agent will precipitate substantially uniformly throughout the body, (4) increasing the temperature of the body at a rate of from 2° C. to 10° C. per minute to a second temperature from 50° C. to 100° C. above said first temperature, (5) maintaining the second temperature for a period of time of from 2 to 4 hours, (6) increasing the temperature of the body to a temperature within 100° C. to 200° C. of the liquidus temperature of the body, whereby crystallization of the glass about the precipitated nucleating agent is initiated, (7) maintaining said last temperature for a period of time of from 2 hours to 4 hours, whereby from about 85% to 95% by weight, of the body is crystallized about the precipitated nuclei, and (8) cooling the resulting body to room temperature.

8. A process for the preparation of a two-phase glass-ceramic body consisting essentially of (1) preparing a crystallizable lead borate glass body from a charge containing from 10% to 0.01% by weight, as the sole nucleating agent at least one nucleating agent selected from the group consisting of the elements, copper, gold, and silver; oxides of copper, cobalt, cadmium, calcium, antimony, and manganese; carbonates of calcium, cobalt, and cesium; sulfides of copper, cadmium and cobalt; chlorides of cadmium, cobalt, gold, silver, and manganese; and fluoride of cadmium bringing the glass body to a predetermined elevated first temperature at which the nucleating agent is activated, said elevated first temperature ranging from slightly less than the deformation temperature of the glass composition to 50° C. below the deformation temperature, (2) maintaining said first temperature for a period of time sufficient to establish thermodynamic equilibrium, (3) cooling the body from 50° C. to 100° C. at a rate of from 2.5° C. to 8° C. per minute, whereby the nucleating agent will precipitate substantially uniformly throughout the body, (4) increasing the temperature of the body at a rate of from 2° C. to 10° C. per minute to a second temperature from 50° C. to 100° C. above said first temperature, (5) maintaining the second temperature for a period of time of from 2 to 4 hours, (6) increasing the temperature of the body to a temperature within 100° C. to 200° C. of the liquidus temperature of the body, whereby crystallization of the glass about the precipitated nucleating agent is initiated, (7) maintaining said last temperature for a period of time of from 2 hours to 4 hours, whereby from about 85% to 95% by weight, of the body is crystallized about the precipitated nuclei, and (8) cooling the resulting body to room temperature.

9. A process for the preparation of a two-phase glass-ceramic body consisting essentially of (1) preparing a crystallizable lead borate phosphate glass body from a charge containing as the sole nucleating agent from 10% to 0.01% by weight, of at least one nucleating agent selected from the group consisting of the elements copper, gold, and silver; oxides of copper, cobalt, cadmium, calcium, antimony, and manganese; carbonates of calcium, cobalt, and cesium; sulfides of copper, cadmium, and cobalt; chlorides of cadmium, cobalt, gold, silver, and manganese; and fluoride of cadmium, bringing the glass body to a predetermined elevated first temperature at which the nucleating agent is activated, said elevated first temperature ranging from slightly less than the deformation temperature of the glass composition to 50° C. below the deformation temperature, (2) maintaining said first temperature for a period of time sufficient to establish thermodynamic equilibrium, (3) cooling the body from 50° C. to 100° C. at a rate of from 2.5° C. to 8° C. per minute, whereby the nucleating agent will precipitate substantially uniformly throughout the body, (4) increasing the temperature of the body at a rate of from 2° C. to 10° C. per minute to a second temperature from 50° C. to 100° C. above said first temperature, (5) maintaining the second temperature for a period of time of from 2 to 4 hours, (6) increasing the temperature of the body to a temperature within 100° C. to 200° C. of the liquidus temperature of the body, whereby crystallization of the glass about the precipitated nucleating agent is initiated, (7) maintaining said last temperature for a period of time of from 2 hours to 4 hours, whereby from about 85% to 95% by weight, of the body is crystallized about the precipitated nuclei, and (8) cooling the resulting body to room temperature.

10. A two-phase glass-ceramic body wherein 80% to 95%, by weight of the two-phase glass ceramic body, comprises essentially homogeneously nucleated fine crystals having an average diameter of the order of 10 to 15 microns, each crystal comprising a devitrified glass and a nucleus of a nucleating agent in an amount of from 0.01% to 10% of the body which in charge form consisted of at least one of the group consisting of the elements copper, gold, and silver; oxides of copper, cobalt, cadmium, calcium, antimony, and manganese; carbonates of calcium, cobalt, and cesium; sulfides of copper, cadmium and cobalt; chlorides of cadimum, cobalt, gold, silver and manganese; and fluoride of cadmium and 20% to 5%, by weight, of a glass phase forming a matrix surrounding and binding the crystals into the body, said phase and the devitrified glass in the crystals comprising as a major constituent at least one component selected from the group consisting of SiO$_2$, PbO, B$_2$O$_3$ GeO$_2$ and P$_2$O$_5$ and as a minor constituent at least one basic metal oxide selected from the group consisting of Al$_2$O$_3$, CaO, BeO, MgO, CoO, ZnO, ZrO, SrO, CdO, BaO, PbO, MnO, FeO and NiO.

11. A two-phase glass-ceramic body wherein 85% to 95%, by weight of the two-phase glass-ceramic body, comprises essentially homogeneously nucleated fine crystals having an average diameter of the order of 10 to 15 microns, each crystal comprising a devitrified glass and a nucleus of a nucleating agent in an amount of from 0.01 to 10% of the body which in charge form consisted of at least one of the group consisting of the elements copper, gold, silver and platinum; oxides of copper, cobalt, cadmium, calcium, antimony, and manganese; carbonates of calcium, cobalt, and cesium; sulfides of copper, cadmium and cobalt; chlorides of cadmium, cobalt, gold, silver, and manganese; and fluoride of cadmium and 15% to 5%, by weight, of a glass phase forming a matrix surrounding and binding the crystals into the body, said phase and the devitrified glass in the crystal, comprising as a major constituent at least one component selected from the group consisting of SiO$_2$, PbO, B$_2$O$_3$, GeO$_2$ and P$_2$O$_5$ and as a minor constituent at least one basic metal oxide selected from the group consisting of Al$_2$O$_3$, CaO, BeO, MgO, CoO, ZnO, ZrO, SrO, CdO, BaO, PbO, MnO, FeO and NiO.

(References on following page)

References Cited by the Examiner

UNITED STATES PATENTS

| | | | |
|---|---|---|---|
| 2,889,952 | 6/1959 | Claypoole | 65—33 |
| 2,920,971 | 1/1960 | Stookey | 106—39 |
| 2,921,860 | 1/1960 | Stookey | 65—33 |
| 2,933,857 | 4/1960 | Stookey | 65—33 |
| 2,951,167 | 8/1960 | Kegg et al. | 65—33 |
| 2,971,853 | 2/1961 | Stookey | 106—52 |
| 3,022,180 | 2/1962 | Morrissey et al. | 106—39 |
| 3,117,881 | 1/1964 | Henry et al. | 106—39 |

FOREIGN PATENTS

| | | |
|---|---|---|
| 1,099,135 | 2/1961 | Germany. |

OTHER REFERENCES

Glass Industry, May 1958, "Recent Translations of Russian papers of Interest to the Glass Industry," pg. 275.

Hinz: Chemical Abstracts, volume 53, July 1959. Item 12615c "Vitro Keram."

Hinz: Silikat. Tech., vol. 10 (Mar. 10, 1959), pub. by German Acad. Sci., Berlin, "Vitrokeram" (pgs. 119–121).

Rindone: J. American Ceramic Society, January 1958, "Influence of Platinum Nucleation on Crystallization of a Lithium Silicate Glass," pgs. 41–42.

Lungu et al.: Ind. usoara (Bucharest), vol. 5, (1958), pgs. 63–65.

TOBIAS E. LEVOW, *Primary Examiner.*

JOHN R. SPECK, H. McCARTHY, *Assistant Examiners.*